(12) United States Patent
Krahenbuhl et al.

(10) Patent No.: US 8,451,104 B2
(45) Date of Patent: May 28, 2013

(54) PASSIVE USER INPUT ATTACHMENT ENGAGING COMPRESSIBLE CONDUCTIVE ELEMENTS AND METHOD FOR USING THE SAME

(75) Inventors: John Henry Krahenbuhl, McHenry, IL (US); Roger Ady, Chicago, IL (US); Jiri Slaby, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 328 days.

(21) Appl. No.: 12/786,922

(22) Filed: May 25, 2010

(65) Prior Publication Data

US 2011/0291820 A1 Dec. 1, 2011

(51) Int. Cl.
*G08B 6/00* (2006.01)
*G09B 21/00* (2006.01)
*H04B 3/36* (2006.01)

(52) U.S. Cl.
USPC .................. 340/407.2; 345/168; 345/174

(58) Field of Classification Search
USPC ..................................... 340/407.2
See application file for complete search history.

(56) References Cited

U.S. PATENT DOCUMENTS

| | | | |
|---|---|---|---|
| 6,888,537 B2 | 5/2005 | Benson et al. | |
| 7,301,435 B2 | 11/2007 | Lussey et al. | |
| 7,423,634 B2 | 9/2008 | Amiri | |
| 7,481,372 B2 | 1/2009 | Wulff et al. | |
| 2004/0155991 A1* | 8/2004 | Lowles et al. | 349/12 |
| 2006/0256090 A1* | 11/2006 | Huppi | 345/173 |

FOREIGN PATENT DOCUMENTS

EP 1418491 5/2004

OTHER PUBLICATIONS

SSI Electronics, "Conductive Rubber Keypads: Design Considerations", www.ssi-electronics.com, unknown publication date, but acknowledged to be prior to the filing date of the present application.
Davenport, Kevin "PCT Search Report and Opinion", Application: PCT/US2011/032947, Filed: Apr. 19, 2011, Mailed: Jul. 21, 2011, Priority: May 25, 2010.

\* cited by examiner

*Primary Examiner* — Travis Hunnings
(74) *Attorney, Agent, or Firm* — Philip H. Burrus; Sylvia Chen

(57) ABSTRACT

A user input attachment (201) is configured to selectively attach to an electronic device (100) such as a mobile telephone. The electronic device (100) includes a plurality of electrode nodes (205), which can be configured separately from each other across one or more surfaces of the electronic device (100). A controller (105), which is operable with the plurality of electrode nodes (205), is configured to sense current flowing through (or voltage across) the electrode nodes (205). The sensed voltage or current establishes an engagement signature (771) dependent upon pressure from compressible conductive elements (207) against electrode nodes (205) from the user input attachment (201), and where included, one or more protuberances (206). The controller (105) is configured to identify the user input attachment (201) from the engagement signature (771), and to detect user input by detecting changes from the engagement signature (771) due to variations in the current (770) in, or voltage across, each of the electrode nodes (205) caused by user manipulation of the user input attachment (201).

19 Claims, 11 Drawing Sheets

PASSIVE USER INPUT ATTACHMENT ENGAGING COMPRESSIBLE CONDUCTIVE ELEMENTS AND METHOD FOR USING THE SAME

BACKGROUND

1. Technical Field

This invention relates generally to a method and system for a passive user input attachment that can be used as an auxiliary control device, and more particularly to a passive user input attachment engaging a plurality of compressible conductive elements that can vary an impedance across corresponding electrode nodes.

2. Background Art

"Intelligent" electronic devices are becoming more and more prevalent in today's society. For example, not too long ago mobile telephones were simplistic devices with 12-key keypads that only made telephone calls. Today, "smart" phones, personal digital assistants, and other portable electronic devices are configured not only to make telephone calls, but also to manage address books, maintain calendars, playing music and video, display pictures, and surf the web.

As the capabilities of these electronic devices have become more complex, so too have their user interfaces. Prior keypads having a limited number of keys have given way to sophisticated user input devices such as touch sensitive screens or touch sensitive pads. In touch-sensitive devices, rather than pressing a series of keys, a user makes a series of gestures along the touch sensitive control surface to manipulate and control applications.

At the same time these devices are becoming more powerful, they are also becoming smaller. This puts a constraint on the functionality of many of today's user interface devices. It can seem that there is never enough surface area for the various user interface controls that a designer may desire to employ for users to navigate between applications. Further complicating matters, as user interfaces get smaller, their operation can become more challenging.

There is thus an opportunity for an improved electronic device offering the flexibility of being able to selectively increase the user input interface.

Figure 1:
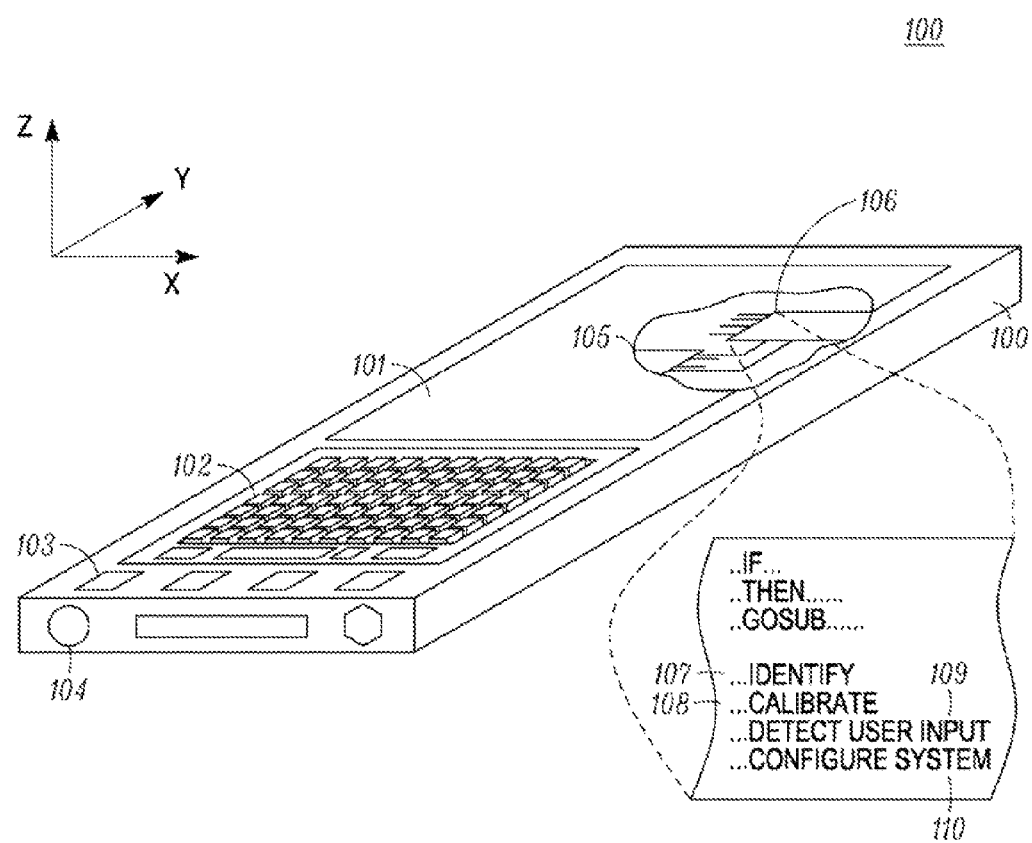
FIG. 1 illustrates one electronic device configured in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Embodiments of the present invention provide a passive user input attachment that can be configured as a user control surface, thereby increasing the area along the electronic device available for user manipulation. The passive user input attachment facilitates user customization of an electronic device, in that different user input attachments can be coupled to the electronic device based upon the operational or control mode desired. Further, embodiments of the present invention provide a fully "postponable" solution, in that a user may purchase an electronic device in a standard configuration initially, and may then customize the electronic device by adding one or more user input attachments at a later time.

Embodiments of the invention allow a user to extend the user control mechanisms without the use of plugs, receptacles, or other standard electrical connections. Embodiments of the invention are cost effective to manufacture. In accordance with embodiments of the invention, one or more processors is capable of both identifying the user input attachment and receiving user input therefrom simply with executable code configured to sense current or voltage from one or more electrode nodes. (Note that the electrode nodes can alternatively be referred to as electrode pads, conductive switch contacts, or conductive contacts, as is known in the art.)

In one embodiment, the passive user input attachment can be configured as a battery door for the electronic device. The passive user attachment includes or engages one or more protuberances. The protuberances can extend from the passive user attachment, or alternatively can simply be part of the electronic device and engaged by the passive user attachment. In the latter scenario, the protuberances can extend upward from the electronic device, rather than being attached to, or extending from, the passive user attachment.

Each protuberance engages one or more compressible conductive elements against complementary electrode nodes. Depending upon the number, location, doping, ductility, and amount of pressure on the compressible conductive elements, a resistance will be established across each electrode node. The resistance affects either voltage across, or current through, each electrode node. The amount of resistance will depend upon the pressure applied to the compressible conductive elements, the elasticity of the compressible conductive elements, and the corresponding surface area with which the compressible conductive element contacts each electrode node. By sensing voltage or current along each electrode node, a controller can identify the user input attachment from its engagement signature.

Once identified, the initial electrical "foot print" across all electrode nodes, referred to herein as an engagement signature, can be calibrated out or normalized such that subsequent changes in current or voltage due to variations in pressure applied by the user, or alternatively the location of contact between the electrode nodes and the compressible conductive elements, can be detected as electrical property variations. Specifically, the electrical property variations will be changes in voltage or current due to impedance changes across the electrode nodes. These electrical property variations can be interpreted by the controller as user manipulation of the user input attachment. Note that current will often be used for illustration purposes. However, it will be clear to those of ordinary skill in the art having the benefit of this disclosure that the impedance established by the compressible conductive elements could be configured in a voltage divider such that voltage could be sensed instead.

While a smart phone will be used in the discussion below as an illustrative electronic device, it will be clear to those of ordinary skill in the art having the benefit of this disclosure that embodiments of the invention are not so limited. For example, the user input attachments described herein can be configured to be operable with any number of electronic devices, including mobile devices, portable computing devices, point of sale terminals, automotive controls, and so forth. Additionally, while a battery door will be used herein as one illustrative user input attachment, it will be clear that any number of attachable devices could also be configured as user input attachments. For example, a user input attachment configured in accordance with embodiments of the invention could be configured as a camera lens cover, a protective casing, a carrying feature, and so forth.

The user input attachments described herein can be configured as control devices in a variety of ways. For example, in one embodiment, the user input attachment is configured as a touch sensitive surface. As the user moves a finger along the user input attachment, the footprint of each compressible conductive element changes from pressure exerted by the user's finger. This change can be detected as user manipulation by sensing changes in voltage or current across each electrode node. Alternatively, the user input attachment can be configured with one or more tactile keys so as to function as a keypad. Optionally, other control devices such as sliders, switches, toggle switches, joysticks and the like can be included in the user input attachment. Although the user interfaces described herein can be different, user input for each is determined through voltage or current changes across each electrode node.

A controller, which receives input from one or more electrode nodes, includes operating modules that are configured to, in one embodiment, both identify the type or configuration of the user input attachment and to adapt the operating mode of the electronic device in response to the identification of the attachment. In one embodiment, when the user input device is coupled to the electronic device, the compressible conductive elements deliver an engagement signature to one or more electrode nodes. The engagement signature can depend upon a number of factors, including the quantity of compressible conductive elements contacting electrode nodes, the geometry of the electrode nodes contacted by compressible conductive elements, and the current or voltage measured across each electrode node. Factors affecting the engagement signature include the doping of the compressible conductive elements contacting the electrode nodes, the location of the compressible conductive elements contacting the electrode nodes, and the current or voltage or signal phase shift measured across each electrode node.

An identification module, which is operable with the controller, is configured to identify the user input attachment from the initial engagement signature. Upon identification, in one embodiment, an adaptation module can then reconfigure the electronic device in response to this identification by altering operating modes, launching applications, and so forth. This reconfiguration can also include an alteration of data presentation on a display. For example, where the display is a touch-sensitive display and the user input attachment is configured as a touch sensitive control device, the controller may alter the presentation on the display in response to the presumption that the user will primarily use the user input attachment for controlling the device rather than the touch screen. The resulting presumptive absence of the user's finger along the display may provide enhanced data presentation options. The adaptation module may make additional changes associated with device performance parameters and user preferences.

Turning now to FIG. 1, illustrated therein is one embodiment of an electronic device 100 configured in accordance with one embodiment of the invention. The electronic device 100, shown for illustration purposes as a smart phone, includes a display 101, and one or more ports and connectors 104. A user input component 102, shown illustratively in FIG. 1 as a keypad, and one or more optional dedicated keys 103 are also included.

A controller 105 is operable within the electronic device 100. The controller 105, which may be a microprocessor, programmable logic, application specific integrated circuit, or other similar device, is capable of executing program instructions, such as those shown in FIG. 21. The program instructions may be stored either in the controller 105 or in a memory 106 or other computer readable medium operable with the controller 105.

In one embodiment, the controller 105 is configured to be operable with one or modules to carry out functionality of embodiments of the invention. In the illustrative embodiment of FIG. 1, the modules include an identification module 107, a calibration module 108, an input sensing module 109, and an adaptation module 110. Other modules could be included without departing from the spirit and scope of the disclosure. These modules can be configured as executable code, or alternatively may be configured as hardware, such as in programmable logic or other devices incorporated in, substituted for, or operable with the controller 105. The controller 105, along with each of these modules, is also configured to be operable with the other components of the system, including elements such as display drivers, communication circuits, user input ports or controls, and so forth.

The identification module 107 is configured to identify the type of user input attachment that has been coupled to the electronic device. As will be shown below, this is accomplished by analyzing an engagement signature that occurs when the user input attachment is initially coupled to the electronic device 100. The engagement signature analysis can include sensing either voltage or current across electrode nodes.

The calibration module 108 can then be used to calibrate out the initial engagement signature. This "calibrating out" process permits the input sensing module 109 to detect changes in current through, or voltage across, the electrode nodes. When a user manipulates the user input attachment, the compressible conductive elements expand and contract against the electrode nodes, thereby changing the impedances across each electrode node. The input-sensing module 109 is configured to detect the resulting change in current or voltage, and then to interpret this as user input.

The adaptation module 110 can reconfigure the electronic device 100 in response to a user input attachment being attached. The reconfiguration can occur in a variety of different ways. In one embodiment, the adaptation module 110 can reconfigure the way data is presented on the display 101. Such a reconfiguration can include moving information, rescaling information, or re-positioning information as a particular application running on the electronic device 100 may instruct.

In another embodiment, the adaptation module 110 can be configured to launch one or more user applications when the user input attachment is attached to the electronic device 100 and identified. Illustrating by way of example, if the user input attachment is configured as a game controller, a user preference in memory 106 may request that a particular game be launched when the user input attachment is attached to the electronic device 100. Similarly, if the user input attachment is configured as a media player controller, the user may desire a music player or video player application to be launched by the controller 105 of the electronic device 100 when the media player user input attachment is attached. Accordingly, the controller 105 can be configured to operate in conjunction with the adaptation module 110 to achieve these results.

In another embodiment, the adaptation module 110 can be configured to alter settings relating to signal levels or other data output characteristics. Continuing the gaming controller example from the preceding paragraph, when a game controller is attached, the controller 105 may amplify the sound or haptic feedback delivered by the electronic device 100 to the user.

Figure 2:
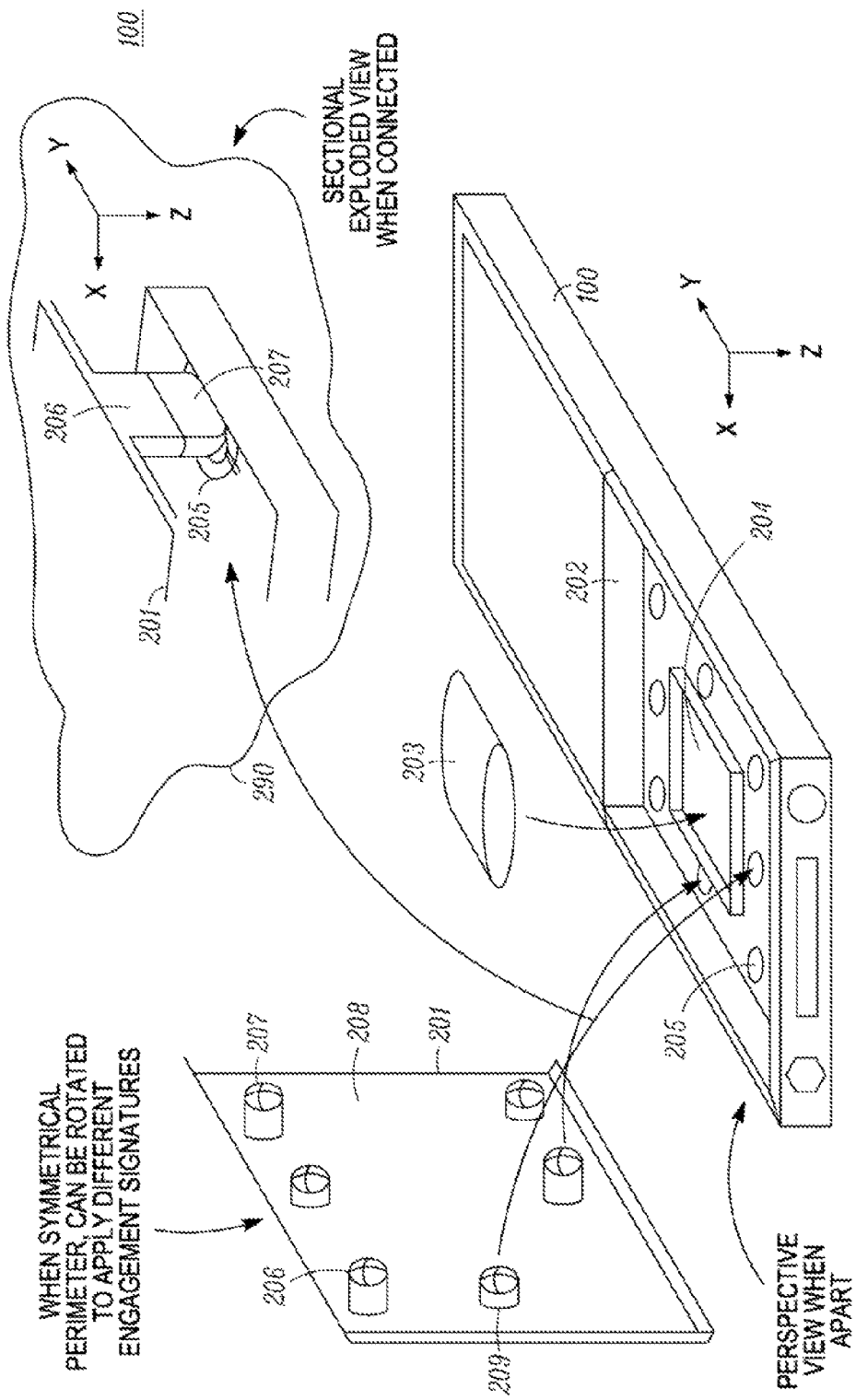
FIG. 2 illustrates one electronic device and passive user input attachment configured in accordance with one embodiment of the invention.

FIG. 2 illustrates an electronic device 100 and a user input attachment 201 in accordance with embodiments of the invention in perspective view, with a sectional view 290 shown as a blown-up image above the electronic device 100. The user input attachment 201 is configured for selective attachment to the electronic device 100, meaning that a user may attach and detach the user input attachment to and from the electronic device 100 as desired. When the user input attachment 201 is symmetrical, the user can rotate it about the z-axis to deliver different engagement signatures to the electronic device 100.

The user input attachment 201 of FIG. 2 is considered to be "passive" in that it contains no active components and itself contains no source of electromotive force. Said differently, there are no devices in the user input attachment 201 that require a voltage input to operate.

In the illustrative embodiment of FIG. 2, the user input attachment 201 is configured as a battery door. A battery compartment 202 is present in the electronic device 100 and is configured to receive a rechargeable or primary battery 203 in a battery well 204. The battery door couples to the electronic device so as to cover the battery compartment 202.

Disposed within the battery compartment 202 is a plurality of electrode nodes 205. The plurality of electrode nodes 205 shown in FIG. 2 are separate from each other, and are disposed across an interior surface of the electronic device. While the plurality of electrode nodes 205 are disposed across a single surface of the electronic device in FIG. 2, they may be disposed along multiple surfaces as well, as will be shown in FIGS. 10-12.

Figure 3:
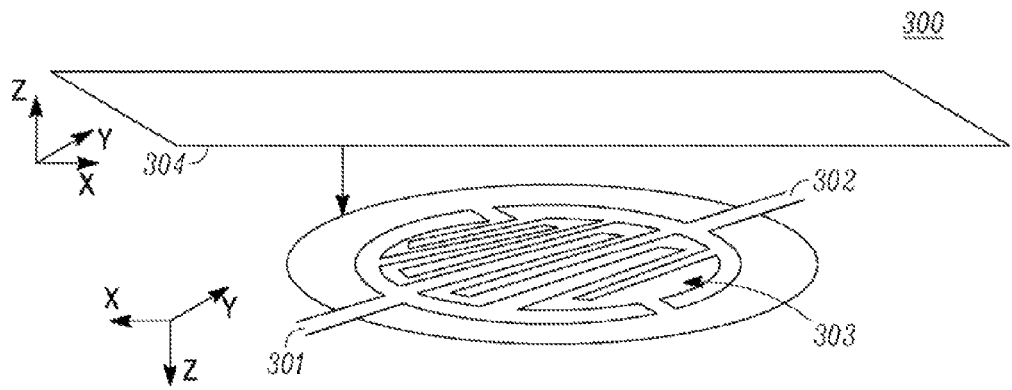
FIG. 3 illustrates an exemplary electrode node configured in accordance with embodiments of the invention.

Turning briefly to FIG. 3, illustrated therein is a magnified view of one embodiment of an electrode node 300. This electrode node 300 can be repeated to form the plurality of electrode nodes (205) shown in FIG. 2.

The electrode node 300 has two conductors 301,302, which may be configured as exposed copper or aluminum traces on a printed circuit board or flexible substrate. The two conductors 301,302 are not electrically connected with each other. In one embodiment, the two conductors 301,302 terminate in an interlaced finger 303 configuration where a plurality of fingers from the first conductor 301 alternate in an interlaced relationship with a plurality of fingers from the second conductor 302.

The electrode node 300 can be configured in a variety of ways within the electronic device (100). For example, in one embodiment the electrode node 300 can be simply be left exposed along a surface of the electronic device (100). In another embodiment, as will be described in FIG. 4, the electrode node 300 can be sealed to prevent dirt and debris from compromising the operative reliability of the electrodes. In another embodiment, a conductive covering 304 can be placed atop the electrode node 300 to permit the electrode node 300 to be exposed, yet protected from dirt and debris.

In the illustrative embodiment of FIG. 3, the electrode node 300 is configured to be circular. It will be clear to those of ordinary skill in the art having the benefit of this disclosure that embodiments of the invention are not so limited. The electrode node 300 can be configured in any of a number of geometric shapes, sizes, and interlacing configurations.

Turning back to FIG. 2, the user input attachment 201 includes a plurality of protuberances 206 disposed along the user input attachment 201 in locations that are complementary to the locations of the electrode nodes 205. Said differently, when the user input attachment 201 is attached to the electronic device, each protuberance 206 aligns geometrically with at least one electrode node 205. Thus, when the user input attachment 201 is attached to the electronic device 100, at least one of the plurality of protuberances 206 aligns with a corresponding electrode node 205.

Note that the number of protuberances 206 can be the same as, greater than, or less than the number of electrode nodes 205. In the illustrative embodiment of FIG. 2, the number of protuberances 206 is less than the number of electrode nodes 205, as eight electrode nodes 205 are shown and only six protuberances are present. As will be described below, the number, location, or combinations thereof can further be used to identify the user input attachment 201.

Each protuberance 206 is configured to engage a compressible conductive element 207 with a corresponding electrode node 205. The compressible conductive elements 207 are manufactured from resilient, pliable materials such as elastomers. They are further capable of conducting current. Such conductive elastomers are known in the art, and are sometimes referred to as "resistive pills." The benefits of conductive elastomers as they relate to embodiments of the present invention are four-fold: First, they are compressible. This allows for varying surface contact areas to be created across the electrode nodes. Second, conductive elastomers may be designed with resistances that are within acceptably accurate ranges. Third, the elastomers may be doped with various materials to set an associated resistance, or to vary the resistances of each resistive pill that is operative with a user input attachment. Fourth, conductive elastomers are easily shaped. As shown in FIG. 2, the base of each compressible conductive element 207 is round. Such a geometric configuration is readily achievable when using conductive elastomers.

In the illustrative embodiment of FIG. 2, the protuberances 206 have varying heights. For example, protuberance 206 is taller than protuberance 209. By designing the protuberances 206 with differing heights, each protuberance 206 can press each compressible conductive element 207 against a corresponding electrode node 205 with a different amount of force, thereby establishing a different resistance across each electrode node 205. By using soft, pliable, conductive elastomer material having a rounded lower surface area for the compressible conductive elements 207, each gets "sandwiched" against the corresponding electrode node 205 in varying degrees. This results in more or fewer of the interlaced fingers (303) of the electrode node 205 coming into contact with the compressible conductive elements 207. Where the controller (105) is capable of detecting current flowing through—or voltage across—each electrode node, the controller (105) can detect an electrical equivalent, i.e., voltage or current, corresponding to how "hard" a protuberance 206 is pressing the compressible conductive element 207 against the electrode node 205 and from what material or shape the compressible conductive element 207 is made.

By examining the voltage across or current through each electrode node 205, the controller (105) is configured to determine the engagement signature created by the plurality of compressible conductive elements 207, or the elasticity of each compressible conductive element 207. The initial engagement signature can be a function of the number of protuberances, the location of the protuberances, and the height or physical configuration of the protuberance. Additionally, the initial engagement signature can be a function of the doping of each compressible conductive element 207. The controller (105) can identify the user input attachment 201 from the initial engagement signature.

After the controller (105) has identified the user input attachment 201, the controller (105) can be configured to do any of a variety of things. First, it can continue to sense current flowing through (or voltage across) each of the electrode nodes 205 to detect user input. In one embodiment, this is accomplished by detecting variations from the engagement signature by sensing further changes in current flowing through each one of the electrode nodes 205.

As will be shown below, in one embodiment the user input attachment 201 can be configured as a touch-sensitive surface. When a user manipulates the user input attachment 201 by applying pressure from a finger or stylus, some of the compressible conductive elements 207 will be compressed more, while others will be compressed less. The controller (105) can be configured to detect these changes as user input. The controller (105) optionally can be configured to calibrate out the engagement signature from currents sensed through (or voltages across) the plurality of electrode nodes.

The controller (105) can further be configured to put the electronic device 100 in a particular state or operable mode in response to identifying the user input attachment 201. For instance, the controller (105) can be configured to launch one or more applications upon the user input attachment being coupled to the electronic device 100. The controller (105) can also be configured to reconfigure the user interface.

The controller (105) can further be configured to calibrate the electronic device 100 in accordance with a user profile that is stored in memory. For example, if the user input attachment 201 is configured as a gaming controller, the corresponding profile may cause audible or tactile feedback to be amplified when the gaming controller is attached.

The illustrative protuberances 206 of FIG. 2 extend from a surface 208 of the user input attachment 201 distally in the form of a mechanical post. The mechanical post can be rigid or, in some embodiments such as that shown in FIGS. 6 and 20, can be flexible or compressible. Where the user input attachment 201 is manufactured from a thermoplastic material, such as with an injection molding process, the mechanical post can simply be an extension formed from the same material. Where the user input attachment 201 is configured from another material, such as metal, the mechanical post can be adhered thereto by way of adhesives, snaps, rivets, welds, screws or other connecting mechanisms.

In the illustrative embodiment of FIG. 2, each protuberance 206 has a corresponding compressible conductive element 207 at the terminal end. Accordingly, when the user input attachment 201 is coupled to the electronic device 100, the compressible conductive elements 207 are pressed against the electrode nodes 205 by the protuberances 206. This is an "open" configuration, in that each electrode node 205 is exposed along a surface of the electronic device 100. While this is one way to engage the compressible conductive elements 207 with the electrode nodes 205 in accordance with embodiments of the invention, other configurations can be used as well.

Note that in the illustrative embodiment of FIG. 2, the user input attachment 201 is symmetrical in perimeter, in that it is configured a square. Consequently, when the protuberances 206 are configured in an asymmetrical configuration as shown, the user can apply different engagement signatures by rotating the user input attachment 201 about the z-axis and reattaching. Accordingly, a single user input attachment can apply four or more engagement signatures.

Figure 4:
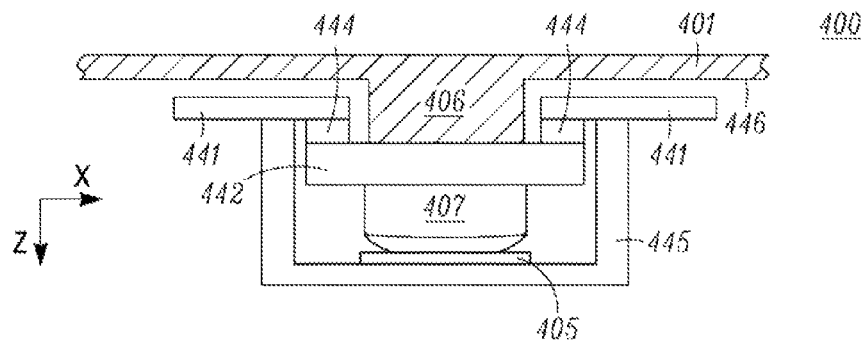
FIG. 4 illustrates an alternate protuberance-compressible conductive element engagement with an electrode node in an electronic device configured in accordance with embodiments of the invention.

FIG. 4 shows an alternate configuration of a compressible conductive element assembly 400 in accordance with embodiments of the invention. The embodiment of FIG. 4 is a "sealed" configuration, in that the electrode node 405 is not exposed to the user.

In FIG. 4, the compressible conductive element 407 is sealed within a well 445 of the electronic device. The electrode node 405 is disposed at the base of the well 445, with the compressible conductive element 407 above. A rigid support 442, which can be made from plastic, is above the compressible conductive element 407. The rigid support 442 serves as a platform by which the protuberance 406 can compress the compressible conductive element 407 against the electrode node 405, thereby varying the surface area and the resulting impedance across the electrode node 405. The rigid support 442 is sealed within the well 445 by a gasket 444.

As with FIG. 2, the user input attachment 401 has a protuberance 406 extending from an inner surface 446 thereof. Alternatively, the protuberance 406 can extend upward from the rigid support 442. In either configuration, when the user input attachment 401 is coupled to the electronic device, the protuberance 406 passes through an aperture within the electronic device's housing 441, thereby engaging the rigid support 442 and compressing the compressible conductive element 407 against the electrode node 405. The gasket 444 flexes to allow the compression, which is dependent upon the length of the protuberance 406.

Figure 5:
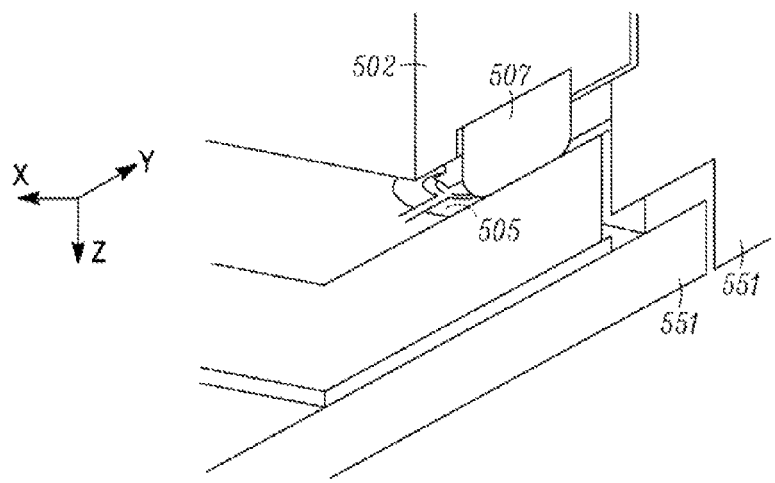
FIG. 5 illustrates a cross sectional view of another protuberance-compressible conductive element engaging an electronic node in an electronic device configured in accordance with embodiments of the invention.

Turning now to FIG. 5, a partially cut-away view shows another configuration by which a compressible conductive element 507 can be pressed against an electrode node 505 disposed within the housing 551 in accordance with embodiments of the invention. The embodiment of FIG. 5 is similar to that of FIG. 2, in that the compressible conductive element 507 is coupled to an inner surface or contour of the user input attachment 502. The protuberance is formed by the compressible conductive element 507 mounted to an inner surface of the user input attachment 502. The electrode node 505 is exposed, but can be covered with the conductive covering to protect it from dirt and debris.

Figure 6:
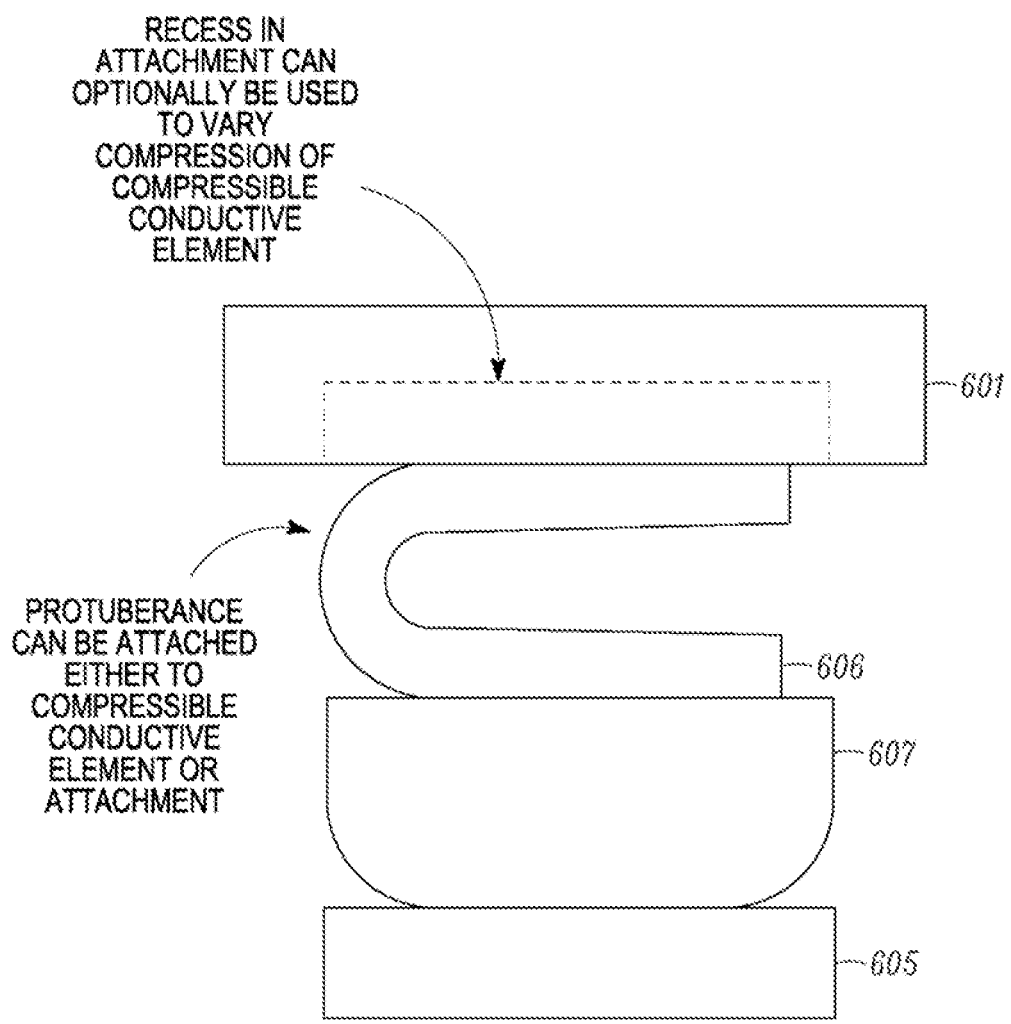
FIG. 6 illustrates one embodiment of a compressible conductive element engaging an electronic node in an electronic device configured in accordance with embodiments of the invention.

FIG. 6 illustrates yet another configuration for the compressible conductive element to engage the electrode node in accordance with embodiments of the invention. In FIG. 6, the protuberance 606 extending from the user input attachment 601 is configured to be compressible. In this illustrative embodiment, the protuberance 606 is configured as a spring member that serves as a compression element when the user manipulates the user input attachment. This protuberance 606 can be attached to the user input attachment 601, or alternatively may extend upward from the electronic device. Note that the spring member could be any of a torsion spring, leaf spring, or other type of spring. By configuring the height of the protuberance 606 and the spring constant of the spring member, a designer may tailor the amount of compression of the compressible conductive member 607 against the electrode node 605 in accordance with a particular application. This height can be adjusted by designing concave contours (shown with the dashed line) in the user input attachment 601 as well.

Figure 7:
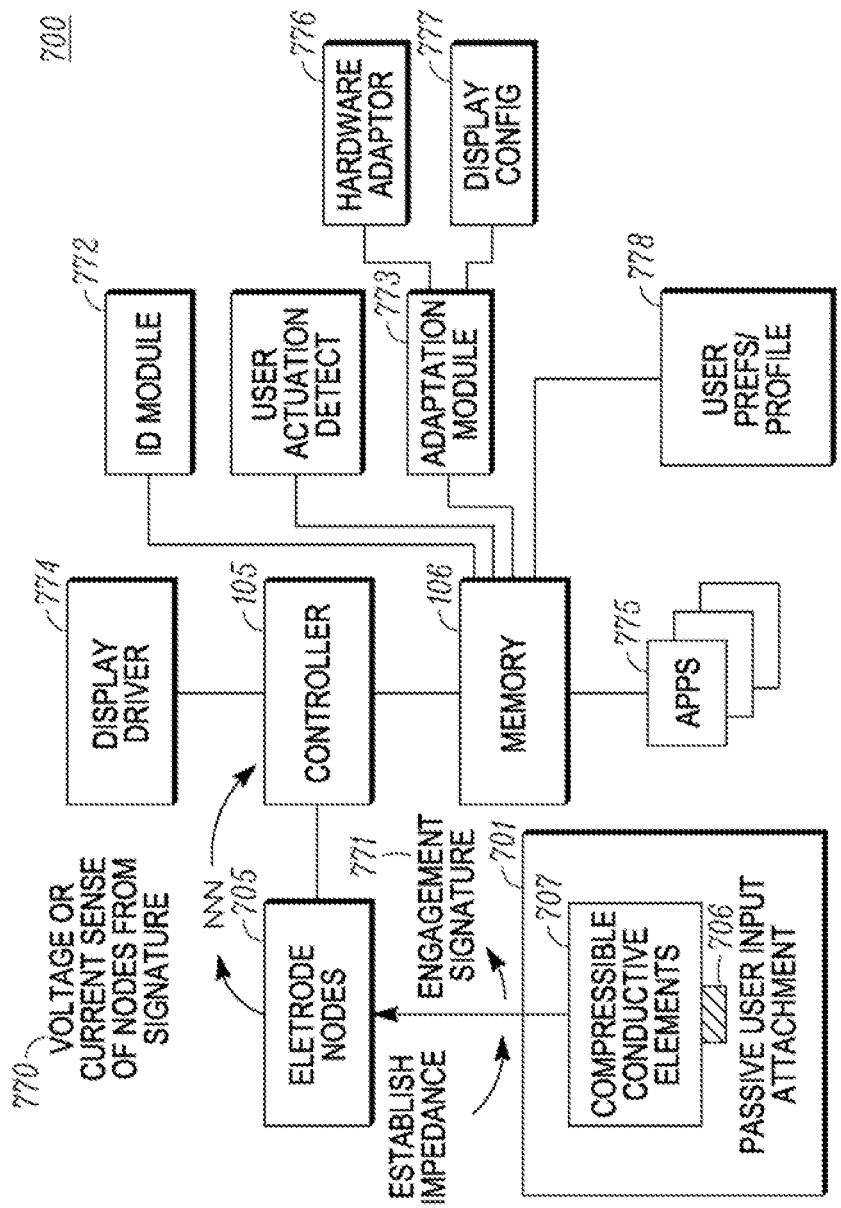
FIG. 7 illustrates a schematic block diagram of one electronic device in accordance with embodiments of the invention.

FIG. 7 illustrates a schematic block diagram 700 of one embodiment of internal circuitry, software modules, firmware modules, and other components in an electronic device (100) configured in accordance with embodiments of the invention. While this schematic block diagram is generalized so as to be applicable to a generic electronic device, note that it could be readily adapted to any number of specific devices, including mobile telephones, smart phones, personal digital assistants, palm-top computing platforms, remote controllers, and other devices.

The controller 105, as noted in FIG. 1, is configured to operate the various functions of the electronic device. The controller 105 may also be configured to execute software or firmware applications stored in memory 106. The controller 105 can execute this software or firmware to provide device functionality.

The plurality of electrode nodes 705 is coupled to, and is operable with, the controller 105. In one embodiment, the controller 105 is configured to be able to sense either current or voltage 770 through each of the plurality of electrode nodes 705. The amount of current or voltage will depend upon the surface area of each of the compressible conductive elements 707 created by pressure of the user input attachment 701, as the surface area defines a corresponding resistance across each electrode node 705. The controller 105 detects this current or voltage across each electrode node 705 as the engagement signature 771 applied by the user input attachment 701.

As noted above, the engagement signature 771 can be dependent upon the size, shape, height, placement, arrangement, and combinations thereof of the protuberances 706 and the compressible conductive elements 707. Additionally, the doping and elasticity of the compressible conductive elements 707 can be changed to vary the impedance across each electrode node 705, thereby changing the engagement signature 771. The surface area of the compressible conductive element 707 affects the impedance across the electrode nodes 705.

After the controller 105 determines the engagement signature 771, an identification module 772 can identify the type of user input attachment 701 that is coupled thereto. The identification module 772 analyzes the engagement signature 771 to identify the user input attachment 701. This can be accomplished in a variety of ways, such as determining the number of compressible conductive elements 707 engaging the electrode nodes 705, the current or voltage through each electrode node 705, the locations of compressible conductive elements 707 engaging electrode nodes 705, or combinations thereof. Each of these, of course, can be determined by sensing current or voltage at each electrode node 705.

After the identification module 772 has identified the user input attachment 701, the adaptation module 773 can alter operating characteristics of the electronic device in a manner that corresponds to the particular type of user input attachment 701. The adaptation module 773 can reconfigure the electronic device in a variety of different ways. In one embodiment, the adaptation module 773 can reconfigure the way data is presented on a display by a display driver 774. For example, where the user input attachment 701 is configured as a touch sensitive surface, the presumption may be that a user will use the user input attachment 701 primarily as a control device. The touch sensitive display can then be used primarily as a display and not as a control input. Accordingly, the adaptation module 773 can cause data such as pictures, text, and other information, to be presented in a larger or different manner than when the user input attachment 701 is not attached to the electronic device.

In another embodiment, the adaptation module 773 can be configured to launch one or more user software applications 775 when the user input attachment 701 is attached to the electronic device. Illustrating by way of example, if the user input attachment 701 is configured as a particular game controller, a user preference in memory may request that a particular game be launched when the user input attachment 701 is attached to the electronic device. Similarly, if the user input attachment 701 is configured as a media player controller, the user may desire a music player or video player application to be launched by the electronic device when the media player user input attachment 701 is coupled thereto. Accordingly, the controller 105 can be configured to operate in conjunction with the adaptation module 773 to achieve these results.

As shown in FIG. 7, the adaptation module 773 can comprise a hardware adaptor 776 and a display configuration adaptor 777. The hardware adaptor 776 can be configured to reconfigure hardware components such as tactile feedback systems, audio outputs, and so forth in response to the user input attachment 701 being coupled to the electronic device. The display configuration adaptor 777 can be configured to resize, scale, reposition, and relocate information presented on the display via the display driver 774. Further, the display configuration adaptor 777 can be configured to adjust brightness or other features of the display as well.

In one embodiment, the adaptation module 773 is configured to work in conjunction with a user preference profile 778 stored in a memory 106 of the electronic device and that corresponds to the specific user input attachment 701 coupled to the electronic device. The user preference profile 778 can take a variety of forms, a few of which will be described here.

In one embodiment, the user preference profile 778 will include operating characteristics corresponding to preferred operational modes of the electronic device. These preferred operational modes can be enabled by the adaptation module 773 when a particular user input attachment is attached to the electronic device. Preferred operating modes can include the following: predefined display characteristics, such as font size, image resolution, display brightness and so forth; a preferred tactile response to be delivered by the electronic device; other user interface signal levels; thresholds for each of the electrode nodes to customize the sensitivity of the user input received by the user input attachment 701, either directly on the surface of the attachment or indirectly through actuation of the attachment, such as by key-press, joystick manipulation, or other methods; and preferences concerning applications launched or the presentation of data as previously described. Other parameters will be obvious to those of ordinary skill in the art having the benefit of this disclosure.

Figure 8:
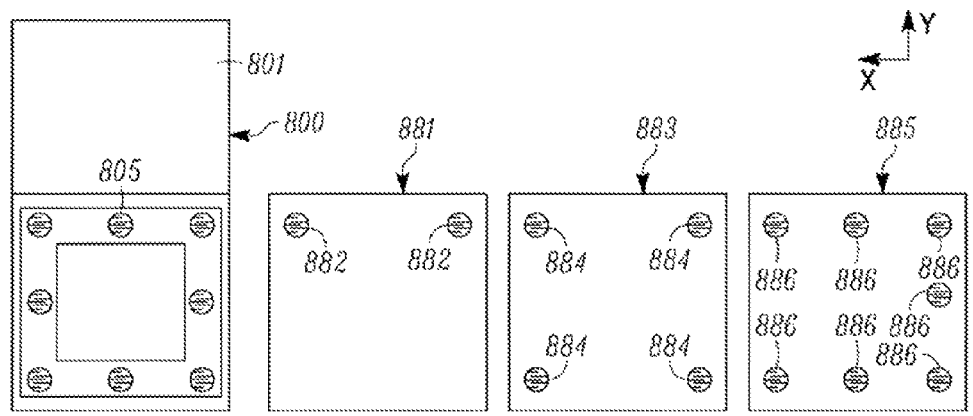
FIG. 8 illustrates various physical configurations of passive user input attachments in accordance with embodiments of the invention.

As noted above, the engagement signature 771 can be based upon a variety of factors. Turning now to FIG. 8, illustrated therein are some initial engagement signatures based upon location and number of compressible conductive elements. As shown in view 800, an electronic device 801 has eight electrode nodes 805 disposed across a surface. User input attachment 881 has two protuberance-compressible conductive element combinations 882, thereby identifying a first type of user input attachment by establishing resistances across the electrode nodes 805. User input accessory 883 has four protuberance-compressible conductive element combinations 884, thereby identifying a second type of user input attachment. User input accessory 885 has seven protuberance-compressible conductive element combinations 886, thereby identifying a third type of user input attachment.

When connecting the different user input attachments 881, 883,885, the electronic device can be put into different operational modes. For example, a first user input attachment 881 can be configured to put the electronic device in a first operable mode, such as by launching a first application, when the first user attachment 881 is coupled thereto in a particular orientation. A second mode of operation can be actuated when the second user input attachment 883 is coupled to the electronic device. Each operable mode can be selected from a plurality of operable modes, each corresponding to an attachment-specific initial engagement signature. By way of example, the first user input attachment may be a touch-surface navigator, while the second is a gaming control, the third is a media control, and so forth.

As can be seen, one advantage of embodiments of the present invention is that a user may have a single electronic device and several user input attachments, each corresponding to a different control mechanism or different application. Further, symmetrical user input attachments can be rotated such that a single user input attachment can correspond to a plurality of control mechanisms depending upon its geometric orientation. As examples, the first user input attachment 881 and the third user input attachment 885 can each create four different initial engagement signatures. The second user input attachment 883 can only create one initial engagement signature due to its symmetry. However, where each of the compressible conductive elements of the second user input attachment 883 have different dopings or elasticities, the symmetry is broken and multiple initial engagement signatures can be created despite the geometrical symmetry.

In one embodiment, to assist the user in easily remembering which user input attachment corresponds to a particular function, the user input attachments can be color-coded. Each color can then correspond to the engagement signature of that user input attachment. For example, the first user input attachment 881 can be red, while the second is blue, and the third is green. By analogy, if the electronic device 801 was a car, each user input attachment 881,883,885 may appear as a different color hood that could be attached.

Figure 9:
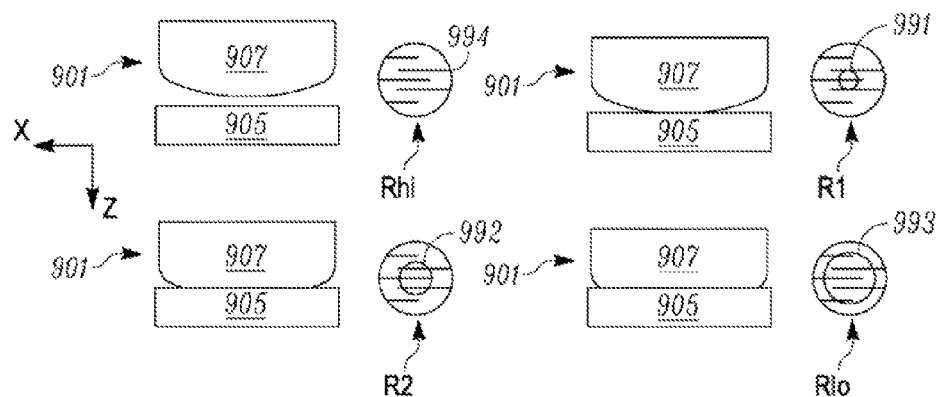
FIG. 9 illustrates exemplary contact configurations between compressible conductive elements and electrode nodes, each resulting in different initial engagements in accordance with embodiments of the invention.

The initial input engagement signature can also depend upon the amount of compression between the compressible conductive elements and the corresponding electrode nodes. Turning now to FIG. 9, illustrated therein is a graphical representation of various compression amounts, each of which establishes a corresponding resistance across the electrode node that can be sensed—either as voltage or current—by the controllers. As noted above, varying compression can be applied in accordance with the size, elasticity, shape, or height of the protuberances or compressive conductive elements, or with the doping of the compressible conductive elements. Each compression amount establishes an impedance that can be determined by sensing a corresponding voltage or current.

In view 901, compressible conductive element 907 is just above the corresponding electrode node 905. Accordingly, the initial engagement 994 that results is no contact. This is the highest impedance, Rhi, as an open circuit exists across the electrode node 905.

In view 902, a first amount of contact is occurring between the compressible conductive element 907 and the corresponding electrode node 905. Accordingly, initial engagement 991 results. This establishes a resistance, R1, of a first value across the electrode node 905.

In view 903, a second amount of contact is occurring between the compressible conductive element 907 and the corresponding electrode node 905. Accordingly, initial engagement 992 results. This establishes a second resistance, R2, with a value that is less than resistance R1, across the electrode node 905.

In view 904, a third amount of contact is occurring between the compressible conductive element 907 and the corresponding electrode node 905. Accordingly, initial engagement 993 results. Presuming that this is maximum compression, a lowest resistance, Rlo, is created across the electrode node 905.

Figure 10:
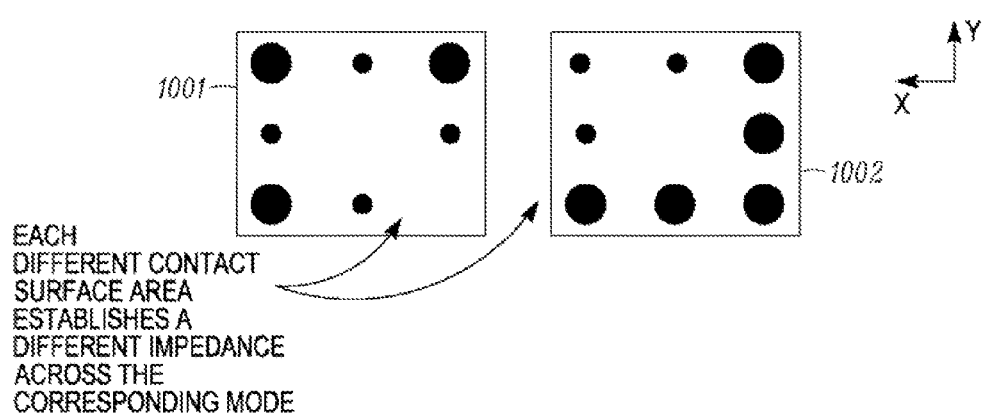
FIG. 10 illustrates two different initial engagements that can be used for identification in accordance with embodiments of the invention.

The initial engagements 991,992,993 shown in FIG. 9 can be combined with location and number shown in FIG. 8 to provide greater resolution of the initial engagement signature. The result is shown in FIG. 10, where two initial surface area contact signatures are shown. The first initial contact area signature 1001 includes seven compressible conductive elements employing two different surface areas in a first configuration. The second initial contact area signature 1002 also includes seven compressible conductive elements, but is in a different geometric configuration and employs three different surface areas. Note that each dot is shown illustratively to represent a different impedance established across a corresponding electrode node. The impedance affects current or voltage sensed through or across each electrode node.

Figure 11:
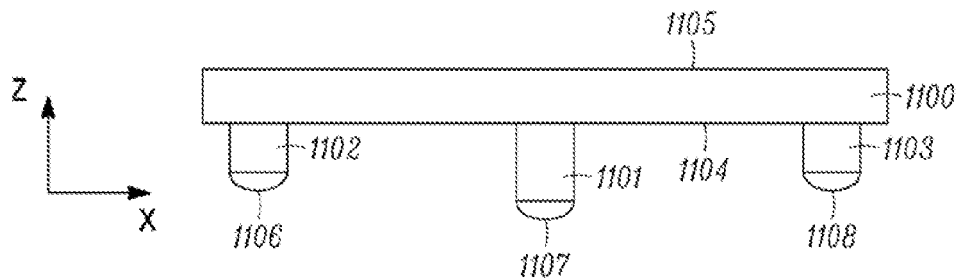
FIG. 11 illustrates one passive user input attachment having protuberances on one major face in accordance with embodiments of the invention.
Figure 12:
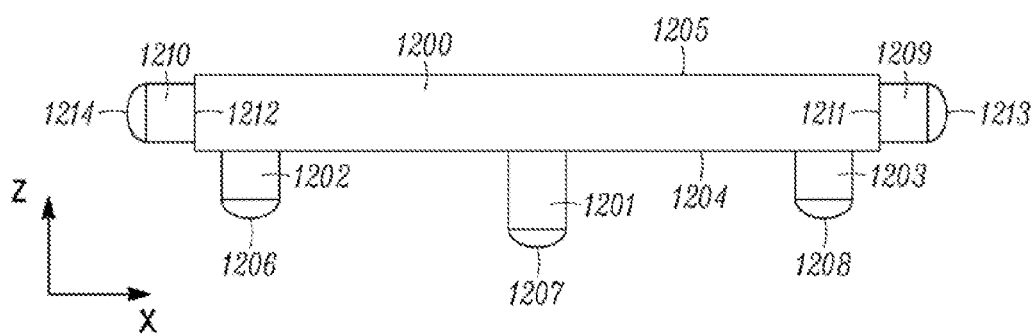
FIG. 12 illustrates one passive user input attachment having protuberances on three major faces in accordance with embodiments of the invention.
Figure 13:
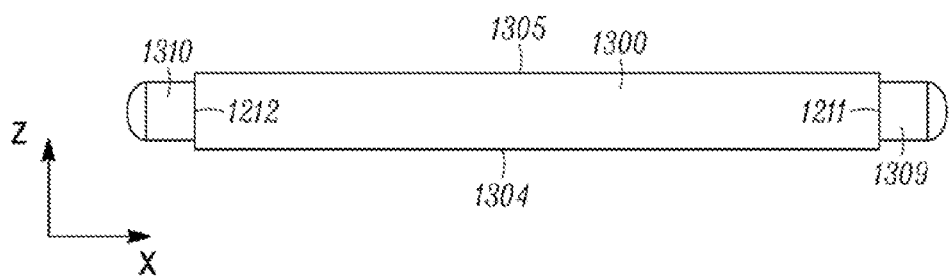
FIG. 13 illustrates an alternate passive user input attachment having protuberances on two major faces in accordance with embodiments of the invention.

To this point, protuberances have been shown as engaging a single face or surface of the user input attachment. However, it will be clear to those of ordinary skill in the art having the benefit of this disclosure that embodiments of the invention are not so limited. Turning now to FIGS. 11-13, illustrated therein are configurations of user input attachments having protuberances extending from non-coplanar faces as well.

FIG. 11 illustrates protuberances 1101,1102,1103 as previously described. Protuberances 1101 of a first height and protuberances 1102,1103 of a second height extend from a surface 1104 of a user input attachment 1100. The location, number, and different heights of the protuberances 1101, 1102,1103 establish an initial engagement signature. As noted above, the various compressible conductive elements 1106,1107,1108 can be doped to different resistances to change the initial engagement signature as well. When a user manipulates the user input attachment 1100 along an opposite surface 1105, the forces from the user change the surface areas applied by the compressible conductive elements 1106, 1107,1108. The controller (105) detects this as user input by sensing the voltage across, or current through, each electrode node.

FIG. 12 illustrates protuberances 1201,1202,1203 as in FIG. 11. Protuberances 1201 of a first height and protuberances 1202,1203 of a second height extend from a surface 1204 of a user input attachment 1200. However, the embodiment of FIG. 12 also includes protuberances 1209,1210 extending from sides 1211,1212. Sides 1211,1212 are geometrically orthogonal with respect to surface 1204. (Note that the compressible conductive elements 1214,1215 may contact their corresponding electrode nodes initially, or may only contact their corresponding electrode nodes upon user manipulation.) The different heights and locations of the protuberances 1201,1202,1203,1209,1210 establish an initial engagement signature.

When a user manipulates the user input attachment 1200 along surface 1205, the forces change the surface areas applied by the compressible conductive elements 1206,1207, 1208. Where the user input attachment 1200 is deformable, such as when it is constructed from a pliable thermoplastic material, the forces will also affect the surface area applied by compressible conductive elements 1213,1214. The controller (105) can detect either or both of these changes as user input by sensing voltage or current at each electrode node. Also, when the user manipulates the user input attachment 1200 laterally along the X-axis, the forces from the user change the surface areas applied by compressible elements 1213,1214. This can be detected by the controller (105) as lateral motion by sensing voltage or current across each corresponding electrode node.

FIG. 13 shows a user input attachment 1300 having protuberances 1309,1310 disposed on oppositely facing sides 1311,1312. This particular configuration offers the advantage of being manipulated by the user from either of surface 1305 or surface 1304.

Figure 14:
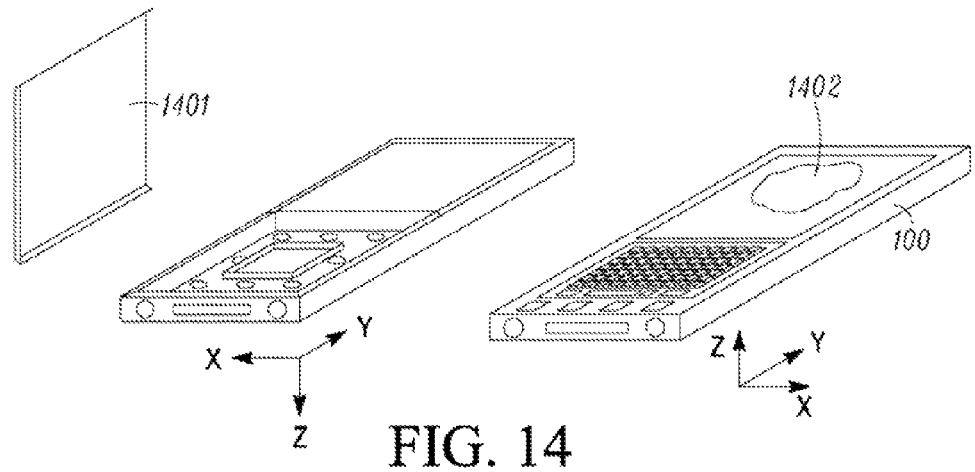
FIG. 14 illustrates an electronic device configured in accordance with embodiments of the invention operating in a first mode.
Figure 15:
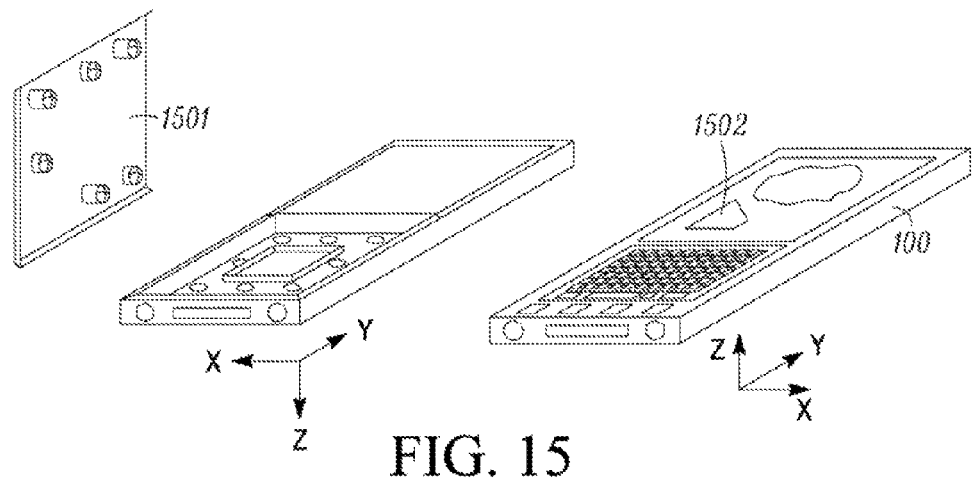
FIG. 15 illustrates an electronic device configured in accordance with embodiments of the invention operating in a second mode.
Figure 16:
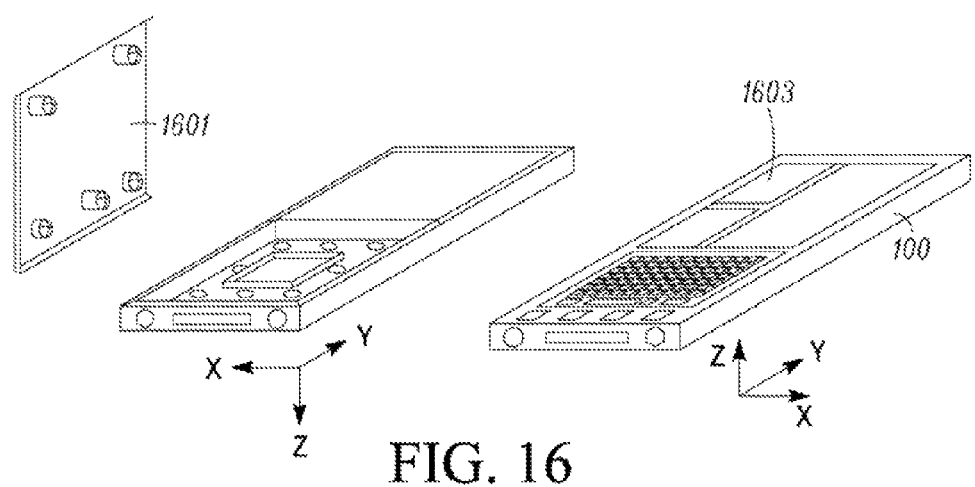
FIG. 16 illustrates an electronic device configured in accordance with embodiments of the invention operating in a third mode.

Turning now to FIGS. 14-16, illustrated therein is an electronic device 100 having various user input attachments 1401, 1501,1601 attached thereto, and entering various operable modes in response to attachment of the respective user input attachments 1401,1501,1601. The electronic device 100 is operating in various modes in FIGS. 14-16. FIG. 14 illustrates the electronic device 100 operating in a default mode, where a standard user input attachment is attached. FIGS. 15 and 16 illustrate two adaptive modes where the adaptation module (773) has reconfigured the electronic device 100 in response to a particular user input attachment 1501,1601 being attached and identified from its engagement signature.

Beginning with FIG. 14, the electronic device 100 has a standard user input attachment 1401 installed. The user input attachment 1401 includes no protuberances or compressible conductive elements. Consequently, the electronic device 100 operates in a default operable mode. For example, if the electronic device is configured as a mobile telephone, a mobile telephone application 1402 may be running on the electronic device 100.

Turning to FIG. 15, a second user input attachment 1501 having six protuberance-compressible conductive elements is attached to the electronic device. This user input attachment 1501 is identified from its initial engagement signature. In response to the user input attachment 1501 being attached, the controller (105) has entered a second operative mode by launching a new application 1502.

Turning now to FIG. 16, a third user input attachment 1601 is attached. The third user input attachment 1601 has five protuberance-compressible conductive element combinations. Upon identification, the controller (105) employs a user preference profile as described above to reconfigure the display and launch a third application 1603.

Figure 17:
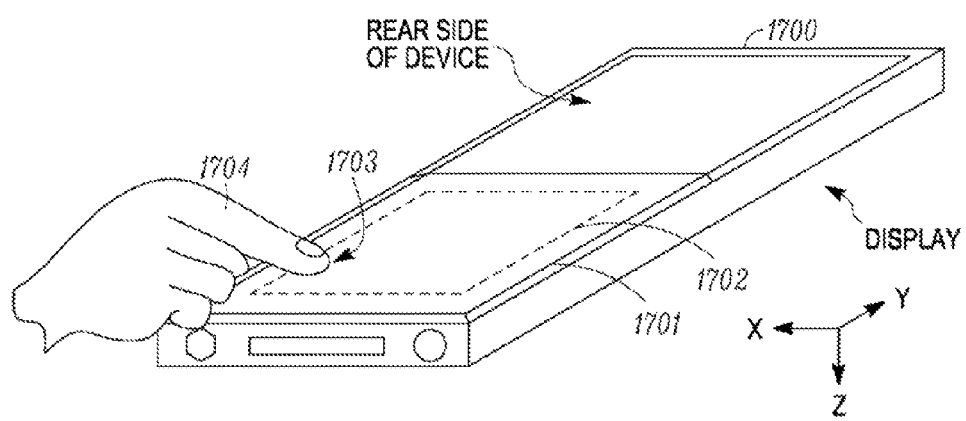
FIG. 17 illustrates one embodiment of a passive user input attachment being used as a touch sensitive navigation device in accordance with embodiments of the invention.

FIG. 17 illustrates therein one example of an application suitable for user input attachments configured in accordance with embodiments of the invention. In FIG. 17, a major face 1702 of the user input attachment 1701 is configured as a touch-sensitive user input. As set forth above, when the user input attachment 1701 is coupled to the electronic device 1700, a controller identifies the user input attachment 1701. In this embodiment, the user input attachment 1701 is identified as a touch sensitive input. Accordingly, the controller may calibrate out the engagement signature so that it may detect force input 1703 from a user 1704 by detecting current or voltage variations from the engagement signature. This is accomplished by detecting current or voltage changes in each of the electrode nodes, with the changes presumptively caused by the user manipulation. Accordingly, the user may employ the user input attachment 1701 as a control device, rather than having to manipulate a navigation device on the front of the electronic device 1700. As such, the user may manipulate cursors or other devices on the display while keeping fingers on the rear of the device. The result is user manipulation and navigation without obscuring the display.

Figure 18:
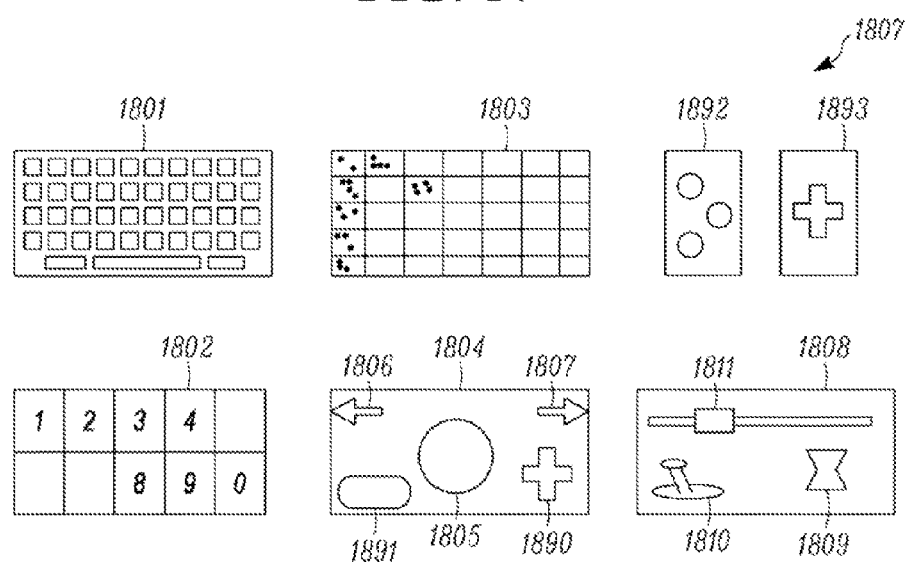
FIG. 18 illustrates various user controls suitable for use with passive user input attachments configured in accordance with embodiments of the invention.

Turning now to FIG. 18, illustrated therein are alternative user interfaces suitable for use with a user input attachment in accordance with embodiments of the invention. While the user input attachment of FIG. 17 was a touch sensitive user interface, any number of user controls could be used on user input attachments in accordance with embodiments of the invention. Some of these controls are shown in FIG. 18. Others will be obvious to those of ordinary skill in the art having the benefit of this disclosure. Those illustrated in FIG. 18 are just a few of the possible configurations of user input attachments that may be created in accordance with embodiments of the invention.

Embodiment 1801 is a configured as a QWERTY keypad. One may initially ask why a user input attachment configured for the rear of the device would be configured as a full QWERTY keypad. However, recall that a battery door for the rear of an electronic device is only an illustrative embodiment. In other embodiments, the user interface itself can be replaced and can be interchangeable by way of the user input attachments described herein. Consequently, a user may desire a QWERTY keypad for one application and a navigational controller for another. Embodiments of FIG. 18 can accommodate a variety of user needs. Further, while a QWERTY keypad is shown for illustration in FIG. 18, note that the keypad could also be configured in non-English languages as well.

Embodiment 1802 is a large numeric keypad, with each key being a large number for easy visibility. This embodiment is well suited for calculator, spreadsheet, and telephonic applications. In the illustrative embodiment of FIG. 18, the large numeric keypad is that of a telephone dialing keypad. Other variants of large numeric keypads may also be created including a standard Bell keypad with the 4×3 matrix structure and the * and # keys.

Embodiment 1803 is a Braille keypad for the visually impaired. Braille keypads can be configured as QWERTY keypads, telephone keypads, or other variants.

Embodiment 1804 is an application specific keypad. It includes features such as a navigational wheel 1805, page back/forward keys 1806, 1807, an enter key 1891, and a D-pad 1890.

Embodiment 1807 is a game controller attachment that is configured in two pieces 1892, 1893. Each piece can be part of a unitary user input attachment, or alternatively can be two user input attachments configured to be coupled to an electronic device. In one embodiment, the user input attachments can be coupled to distal ends of an electronic device to simulate a conventional game controller.

Embodiment 1808 is a multifunction keypad illustrating some of the varied controls that can be included with user input attachments configured in accordance with embodiments of the invention. Such controls include sliders 1811, rockers 1809, and joysticks 1810.

Figure 19:
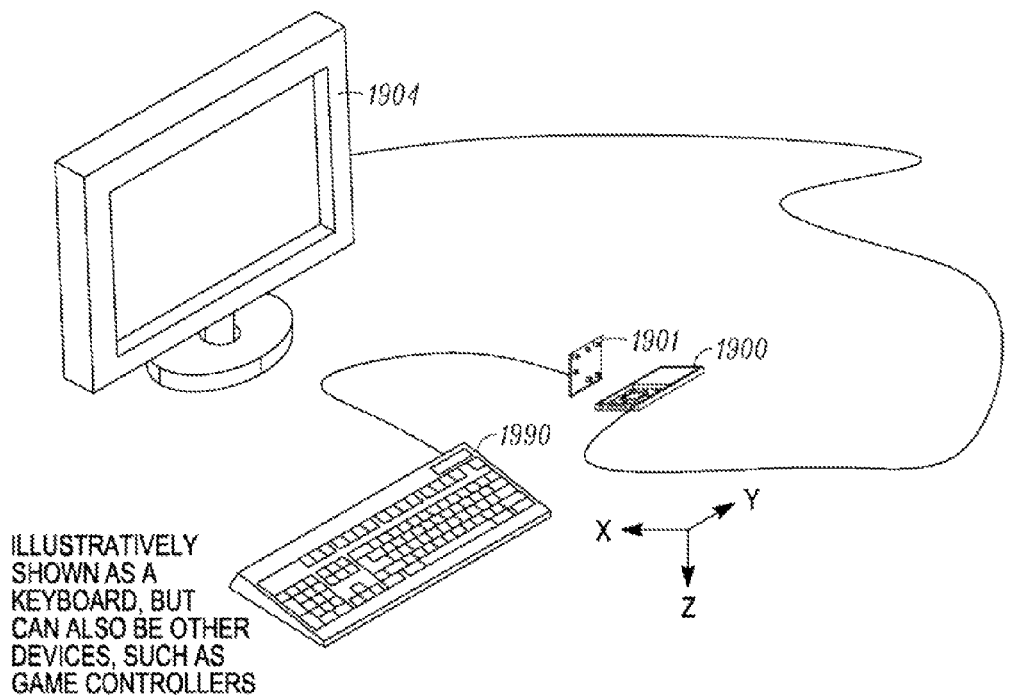
FIG. 19 illustrates one application for passive user input attachments configured in accordance with embodiments of the invention.

The embodiments of FIG. 18 are primarily self-contained embodiments, i.e., an electronic device coupled to a single user input attachment and running various applications. However, it will be clear to those of ordinary skill in the art having the benefit of this disclosure that embodiments of the invention are not so limited. For example, embodiments of the present invention can be configured to work with other devices as well. Turning now to FIG. 19, illustrated therein are a couple of the possible embodiments thereof.

In FIG. 19, the electronic device 1900 is configured as an interface between a conventional input device 1990, shown here as a keyboard, and an auxiliary device 1904, shown here as a monitor. As such, the user input attachment 1901 works as a user control interface operable with the conventional input device 1990. The electronic device 1900 then delivers control signals from the conventional input device 1990 to the auxiliary device 1904.

In this configuration, the user input attachment 1901 is configured as an adaptor for the conventional input device 1990. Since the user input attachment 1901 is a passive device, i.e., one using mechanical forces applied to the user input attachment 1901 to affect the compression of compressible conductive elements against electrode nodes to change the corresponding resistances, the user input attachment 1901 of FIG. 19 would require a source of electromotive force to compress and relieve the compressible conductive elements.

Figure 20:
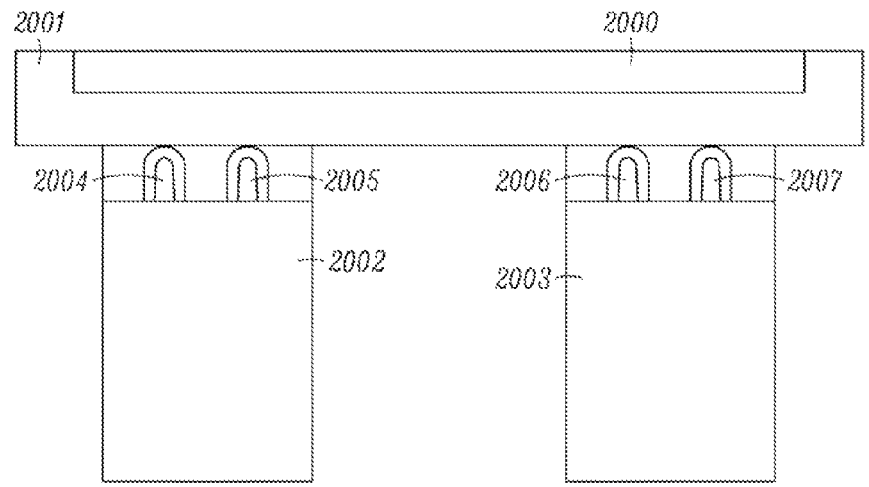
FIG. 20 illustrates another application for passive user input attachments configured in accordance with embodiments of the invention.

Turning to FIG. 20, illustrated therein is an embodiment of the invention that can work as a passive user input attachment 2001 without any electromotive forces. The embodiment of FIG. 20 is that of a game controller, where the user input attachment 2001 has two handles 2002,2003. When the user manipulates the handles 2002,2003, compressible conductive elements 2004,2005,2006,2007 are compressed and relieved, thereby conveying user input to the electronic device 2000.

Variations on this configuration can be created as well. For example, one simple variation would be to substitute other conventional input devices for the gaming controller of FIG. 20. Multimedia controllers, industrial device controllers intended for use in various environmental conditions, accessories for data collection and transfer, remote control devices, and so forth may be so substituted for the gaming controller of FIG. 20.

Note also that in the illustrative embodiment of FIG. 20, no intelligence or active hardware is required in the user input attachment 2001 to convey user input to the electronic device 2000. The intelligence of the electronic device 2000 can all be provided by the controllers (105) disposed therein.

Figure 21:
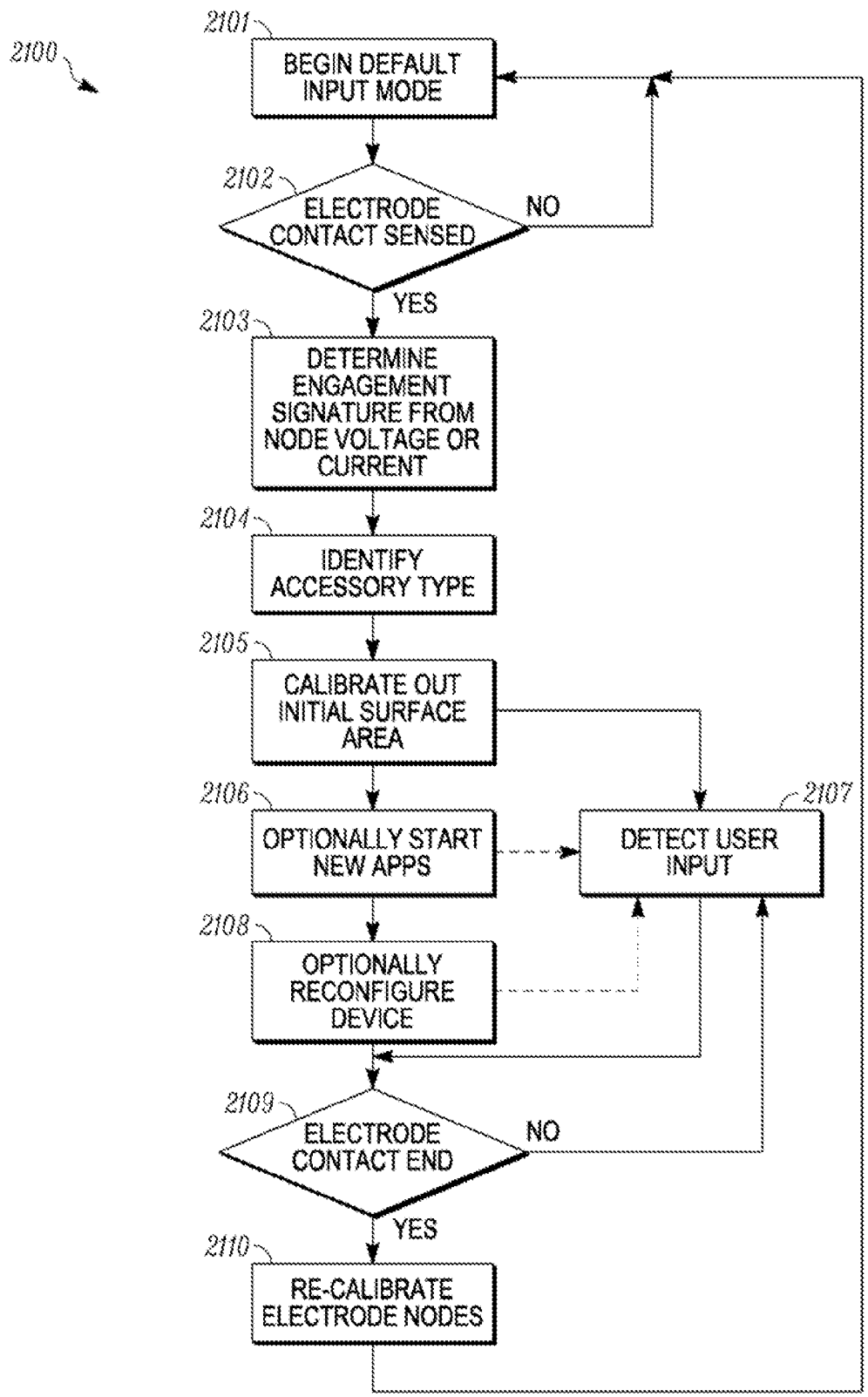
FIG. 21 illustrates one method suitable for execution with one or more controllers in an electronic device configured in accordance with embodiments of the present invention.

Turning now to FIG. 21, illustrated therein is one method 2100, which can be executed with one or more controllers in an electronic device, of configuring the electronic device in response to a user input attachment being attached thereto. More specifically, the method 2100 can be used for configuring the electronic device in response to a passive user input attachment engaging compressible conductive elements with one or more electrode nodes.

At step 2101, the electronic device starts by operating in a default input mode as depicted in FIG. 14. Decision step 2102 determines whether a user input attachment has been attached. This is accomplished by determining whether default impedances—all of which will be open circuits in this embodiment—have changed across any of the electrode nodes. The controller does this by sensing voltage or current across each electrode node. Where it has not, the method 2100 returns to step 2101.

Where a user input attachment engaging compressible conductive elements has been attached, one or more controllers identify the engagement signature by detecting currents flowing through—or voltages across—each of the plurality of electrode nodes at step 2103. The currents or voltages will establish the engagement signature created by pressure against corresponding compressible conductive elements to corresponding electrode nodes. At step 2104, the controller identifies the user input attachment from the engagement signature.

At optional step 2105, the controller may calibrate out the engagement signature such that actuation of the user input interface can be detected. This calibration can include basing currents flowing through (or voltages across) the electrode nodes as being relative to those flowing (or across) when the engagement signature is established, so that changes in current (or voltage) thereafter are detected as user input.

As noted above, in one embodiment the one or more processors can cause the electronic device to enter a predetermined operating mode based upon the identity of the user input attachment. This occurs in the illustrative method of FIG. 21 in steps 2106 and 2108.

In step 2106, the processors can launch one or more applications based upon the identity of the user input attachment. As noted above, this can be done by referencing one or more user preferences or profiles in memory. At step 2108, the controllers can optionally reconfigure hardware components, such as tactile feedback systems or audio systems.

During these steps or subsequent to these steps, the controller can detect user actuation of the user input attachment by detecting changes in the currents or voltages in each of the electrode nodes at step 2107. This detecting step can include sensing a change in current in any of the plurality of electrode nodes, and can further include identifying user actuation based upon determining an amount of the change in the current or voltage for any individual electrode node.

At decision 2109, the processors detect removal of the user input attachment. This can be done by sensing current through each node falling to zero, or voltage being pulled to a rail of one of the electrodes. If the initial surface contact area signature was calibrated out at step 2105, it must be calibrated back in at step 2110 to ensure that subsequent user input attachments may be properly identified.

As described herein, user input attachments facilitate the compression of variable resistivity elastomers against electrode nodes, thereby effecting a change in resistance based upon pressure applied by the user input attachment. This applied pressure, which is expressed as an initial engagement signature, is used to identify the type and/or functionality of the user input attachment. Subsequent user manipulation of the user input attachment can be detected through change in pressure, thereby providing a simple, postponable user input device, which is even capable of effecting changes in device configuration.

Embodiments of the present invention provide advantages over prior art accessories in that embodiments of the present invention leverage removable, passive modules while providing an identification feature. In contrast to prior art accessories, no additional hardware, such as Hall effect sensors and the like, is needed to identify the attachments. The identity and specifics of each attachment are provided by a simple array of protuberances and compressible conductive elements.

It should be observed that the embodiments reside primarily in combinations of method steps and apparatus components related to identification and utilization of user input accessories as described herein. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of identification of a user input accessory and corresponding configuration of the electronic device as described herein. As such, these functions may be interpreted as steps of a method to perform the identification and configuration. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Referring to the drawings herein, like numbers indicate like parts throughout the views. As used in the description above and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

What is claimed is:

1. An electronic device, comprising:
   a plurality of electrode nodes, separate from each other across one or more surfaces of the electronic device;
   a passive user attachment configured for selective attachment to the electronic device;
   a plurality of compressible conductive elements disposed between the passive user attachment and the plurality of electrode nodes, thereby engaging each compressible conductive element against a complementary electrode node; and
   a controller, operable with the plurality of electrode nodes and configured to:
   detect an engagement signature defined by a surface area engagement of the each compressible element against the complementary node by sensing one of a voltage across or a current through each electrode node; and
   identify the passive user attachment from the engagement signature;
   wherein the controller is configured to reconfigure the electronic device upon identifying the passive user attachment.

2. The electronic device of claim 1, wherein the controller is further configured to sense user input by detecting changes in the one of the voltage across or the current through the each electrode node.

3. The electronic device of claim 2, wherein the controller is configured to calibrate out the engagement signature from currents sensed through the plurality of electrode nodes prior to detecting user input.

4. The electronic device of claim 1, further comprising a plurality of protuberances engaged between the passive user attachment and the plurality of compressible conductive elements.

5. The electronic device of claim 4, wherein the plurality of protuberances is fewer in quantity than the plurality of electrode nodes.

6. The electronic device of claim 4, wherein each of the plurality of protuberances is disposed along non-coplanar faces of the passive user attachment.

7. The electronic device of claim 1, wherein the plurality of compressible conductive elements are disposed between the each electrode node and a rigid support within a well of the electronic device.

8. The electronic device of claim 1, wherein the passive user attachment can be attached to the electronic device in either of at least two orientation configurations.

9. The electronic device of claim 1, wherein the controller is configured to change an operational mode of the electronic device upon identifying the passive user attachment.

10. The electronic device of claim 1, wherein the controller is configured to launch one or more software applications upon identifying the passive user attachment.

11. The electronic device of claim 1, wherein the controller is configured to calibrate the electronic device in accordance with a profile stored in a memory of the electronic device based upon the engagement signature, wherein the profile comprises one or more of:
   a tactile response to be delivered by the electronic device upon user actuation of the passive user attachment;
   one or more user preferences corresponding to the passive user attachment;
   one or more user interface signal levels; or
   one or more threshold levels for each of the plurality of electrode nodes.

12. The electronic device of claim 1, wherein the plurality compressible conductive elements is fewer in quantity than the plurality of electrode nodes.

13. The electronic device of claim 1, wherein a major face of the passive user attachment is configured as a touch-sensitive user input.

14. The electronic device of claim 1, wherein the passive user attachment comprises a user control comprising one or more of a touch control surface, a keypad having one or more keys, a vision-impaired keypad, a game controller, one or more slider controllers, one or more rocker controllers, or one or more navigational devices, the user control being configured to deliver control signals to the plurality of electrode nodes by engagement of the plurality of compressible conductive elements with the plurality of electrode nodes.

15. A method, employing one or more controllers in an electronic device having a plurality of electrode nodes of configuring the electronic device in response to a passive user input attachment being attached, the method comprising:
   detecting, with the one or more controllers, an engagement signature of the passive user input attachment by sensing one of a voltage across or a current through each of the plurality of electrode nodes that depends upon compression of one or more compressible conductive elements of the passive user attachment against one or more complementary electrode nodes from the passive user input attachment being attached;
   identifying the passive user input attachment from the engagement signature; and
   placing the electronic device in an operating mode based upon the identifying the passive user attachment.

16. The method of claim 15, further comprising detecting user actuation of the passive user input attachment by detecting changes in the voltage across or the current through the each of the plurality of electrode nodes and identifying the user actuation from an amount of change in the voltage across or the current through, and, which one or more electrode nodes corresponds to the amount of change.

17. The method of claim 15, further comprising calibrating out the one of the voltage across or the current through each of the plurality of electrode nodes.

18. The method of claim 15, further comprising launching one or more software applications after the identifying, wherein the one or more software applications are operable with the passive user input attachment.

19. An electronic device, comprising:
   a plurality of electrode nodes, separate from each other across one or more surfaces of the electronic device;
   a passive user attachment configured for selective attachment to the electronic device;
   a plurality of compressible conductive elements disposed between the passive user attachment and the plurality of electrode nodes, thereby engaging each compressible conductive element against a complementary electrode node; and
   a controller, operable with the plurality of electrode nodes and configured to:
   detect an engagement signature defined by a surface area engagement of the each compressible element against the complementary node by sensing one of a voltage across or a current through each electrode node; and
   identify the passive user attachment from the engagement signature;
   wherein the controller is configured to change an operational mode of the electronic device upon identifying the passive user attachment.

* * * * *